March 9, 1954

L. E. SHAW 2,671,583

CARRYING RACK

Filed Oct. 24, 1950

LOUIS EATON SHAW
*INVENTOR.*

BY *Robert Meyer*
*Attorney*

Patented Mar. 9, 1954

2,671,583

UNITED STATES PATENT OFFICE 2,671,583

CARRYING RACK

Louis Eaton Shaw, Newark, N. J.

Application October 24, 1950, Serial No. 191,765

3 Claims. (Cl. 224—42.1)

This invention relates to carrying racks for removable attachment to automobiles, and an object of the invention is to provide a carrying rack which may be quickly and easily attached to or detached from an automobile for the purpose of transporting skis, fishing poles and other articles too long to place inside of the automobile or articles which for some other reason it is not desired to put inside of the car.

Another object of the invention is to provide a carrying rack for attachment to automobiles which when attached is located at one side of the top of the automobile for convenience in placing articles thereon or removing them therefrom, and also a carrying rack which is small so that when detached, a pair of them may be conveniently carried in the trunk, glove compartment or other suitable space in the automobile.

Another object of the invention is to provide a carrying rack as specified which will not mar the finish of the automobile to which it is attached and which embodies a cushioned article supporting surface to prevent marring of the objects carried thereby, as well as to prevent annoying "rattling" of the objects during transit.

With these and other objects in view, as may appear from the accompanying specification, the invention consists of various features of construction and combination of parts, which will be first described in connection with the accompanying drawings, showing a carrying rack of a preferred form embodying the invention, and the features forming the invention will be specifically pointed out in the claims.

Figure 3:
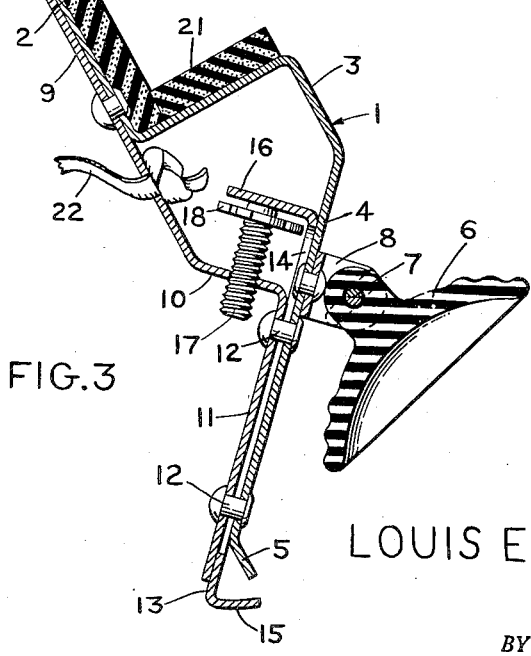
Figure 3 is a vertical section through the carrying rack taken on the line 3—3 of Figure 2.

Referring more particularly to the drawings, the improved carrying rack includes a carrying body 1 made preferably of flat bar metal and bent to form a substantially L-shaped article support 2 at the upper end thereof. The portion of the body 1 below the L-shaped article support 2 has a section 3 which is substantially parallel to the upright of the article support 2 and the remaining portion of the body below the portion 3 is bent at an obtuse angle thereto, as clearly shown in Figures 1 and 3 of the drawings, forming the portion 4 the lower end of which is offset as shown at 5.

Figure 1:
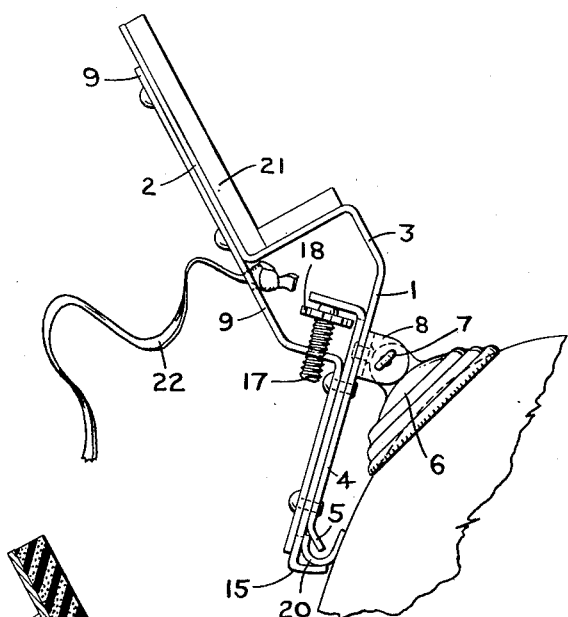
Figure 1 is a side elevation of the improved carrying rack showing it attached to an automobile.
Figure 2:
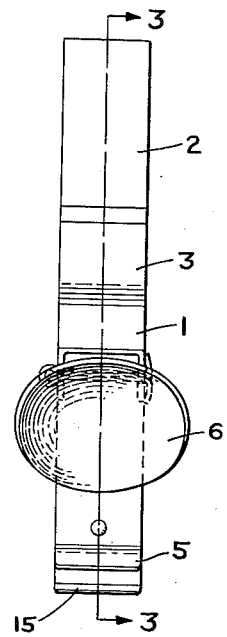
Figure 2 is a front elevation of the carrying rack.

The portion 4 of the carrying body 1 has a rubber or resilient suction cup 6 pivotally connected thereto as shown at 7 through the medium of a bracket 8 so that the cup will automatically adjust itself to properly fit the curvature of the top of an automobile to which it is attached, as shown in Figure 1 of the drawings. A brace 9, which is also a flat bar metal, is attached to the upright of the L-shaped article support 2 and extends downwardly below the bottom thereof and has a portion 10 bent to extend substantially at right angles to the portion 4 of the carrying body 1. The lower end 11 of the brace 9 extends parallel to the portion 4 of the carrying body and is attached thereto by suitable rivets or the like 12, in spaced relation to the portion 4. An adjustable clamp 13 is slidably supported between the sections or portions 4 and 11 and is provided with a longitudinal slot 14 which receives the rivets 12. The lower end of the clamp 13 is angled as shown at 15. The upper end of the clamp 13 is bent substantially at right angles to the main body of the clamp to provide a length 16 which is substantially parallel to the length or portion 10 of the brace 9. An adjusting screw 17 is threadably carried by the section 10 of the brace 9 and engages the angle portion 16 of the clamp 13. A knurled head 18 is mounted on the adjusting screw 17 to facilitate manual rotation thereof for adjustment of the adjustable clamp 13.

In installing the carrying rack on an automobile, the offset end 5 of the carrying body 1 is inserted into the drainage trough 20 which extends along one side of the top of the automobile above the doors and windows thereof with the angled end 15 placed outwardly of the bottom of the trough. The suction cup 6 is then forced firmly against the automobile top directly above the trough 20 and the adjusting screw 17 is adjusted to securely clamp the angled end 15 against the bottom of the trough 20 and force the offset end 5 against the edge of the trough, as clearly shown in Figure 1 to firmly attach the carrier to the automobile. To remove the carrier from the automobile it is only necessary to release the binding connection between the angled end 15, offset end 5 and trough 20 and break the vacuum of the vacuum cup 6 with the top of the automobile, after which the carrier may be easily removed.

The article engaging surface of the L-shaped article support 2 is shown as padded with soft or sponge rubber or the like, as shown at 21, so as to provide a cushioned support for articles carried by the carrier. A flexible strap 22 is connected to the bracket 9 and after the article or articles have been placed upon the L-shaped article support 2 they may be tied thereon by the strap 22.

In use, two or more of the brackets may be attached to an automobile for carrying skis, fishing rods or other articles, and by reference to Figure 1 of the drawings it will be noted that the carrying racks are at one side of the automobile where they can be conveniently reached for placing articles thereon or removing the articles therefrom. The carrying racks are relatively small so that if it is desired they may be carried in a glove compartment or trunk of an automobile when not in use so as to be always convenient. When the racks are attached to an automobile the L-shaped article support 2 is positioned at an angle through the perpendicular to facilitate the supporting of articles, distribution of weight stresses and facilitate the holding of articles on the article support during the tying of the strap 22.

It will be understood that the invention is not to be limited to the specific construction or arrangement of parts shown, but that they may be widely modified within the invention defined by the claims.

What is claimed is:

1. In an article carrying rack for attachment to automobiles, a carrying body including an article support and an attaching extension, said attaching extension having a portion thereof extending at an obtuse angle to the article support and having its free end offset to engage in a drain trough of an automobile, a brace bar rigidly attached to said article support and having a portion of its length disposed parallel to and in slightly spaced relation to the obtuse angled portion of said attaching extension, an adjustable clamp slidably supported between said parallel spaced portions and having one end projecting beyond the offset end of the obtuse angled portion of said attaching extension, said projecting end angled to engage beneath a drain trough of an automobile, said brace and said adjustable clamp having parallel portions extending substantially at right angles to the main body of the adjustable clamp, and an adjusting screw carried by said parallel right angled portion of the brace and engaging the right angled portion of the adjustable clamp for adjusting the position of the clamp relative to the said attaching extension.

2. In an article carrying rack for attachment to automobiles, a carrying body including an article support and an attaching extension, said attaching extension having a portion thereof extending at an obtuse angle to the article support and having its free end offset to engage in a drain trough of an automobile, a brace bar rigidly attached to said article support and having a portion of its length disposed parallel to and in slightly spaced relation to the obtuse angled portion of said attaching extension, an adjustable clamp slidably supported between said parallel spaced portions and having one end projecting beyond the offset end of the obtuse angled portion of said attaching extension, said projecting end angled to engage beneath a drain trough of an automobile, said brace and said adjustable clamp having parallel portions extending substantially at right angles to the main body of the adjustable clamp, and an adjusting screw carried by said parallel right angled portion of the brace and engaging the right angled portion of the adjustable clamp for adjusting the position of the clamp relative to the said attaching extension, a suction cup, and means pivotally connecting said suction cup to the obtuse angled portion of said attaching extension.

3. In an article carrying rack for attachment to an automobile, a carrying body including an article support, a substantially vertical supporting member having its lower end designed to enter the drainage trough of an automobile, a second member parallel to said supporting member and rigidly supported in spaced relation thereto, a portion of said second member being bent substantially at a right angle, a clamping screw adjustably carried by said angled portion, a clamping member slidably disposed between said supporting member and said second member and having its upper end formed to receive the thrust of said clamping screw, and a suction cup pivotally attached to said supporting member.

LOUIS EATON SHAW.

References Cited in the file of this patent

UNITED STATES PATENTS

| Number | Name | Date |
|---|---|---|
| 1,772,439 | Garbs | Aug. 5, 1930 |
| 1,798,872 | Ellis | Mar. 31, 1931 |
| 2,288,442 | Felton | June 30, 1942 |
| 2,461,897 | Hopkins | Feb. 15, 1949 |
| 2,474,513 | Behrens | June 28, 1949 |
| 2,514,266 | Walslager | July 4, 1950 |
| 2,552,879 | Woerner | May 15, 1951 |
| 2,603,394 | Beck | July 15, 1952 |